Figure 1:
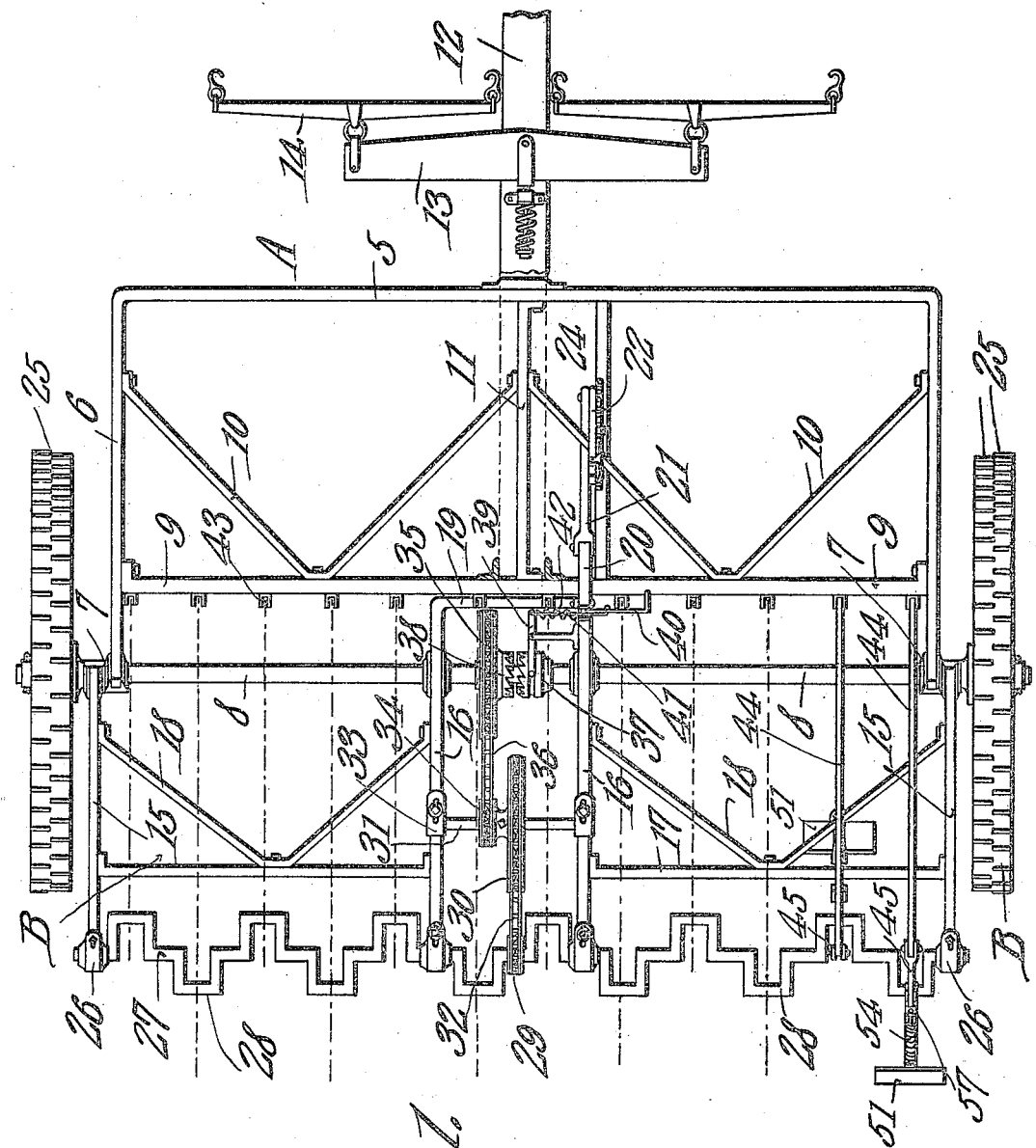

W. F. NIELSEN.
CULTIVATOR.
APPLICATION FILED AUG. 24, 1909.

962,520.

Patented June 28, 1910.

2 SHEETS—SHEET 1.

Inventor
Waldemar F. Nielsen.

Witnesses

By
Attorneys

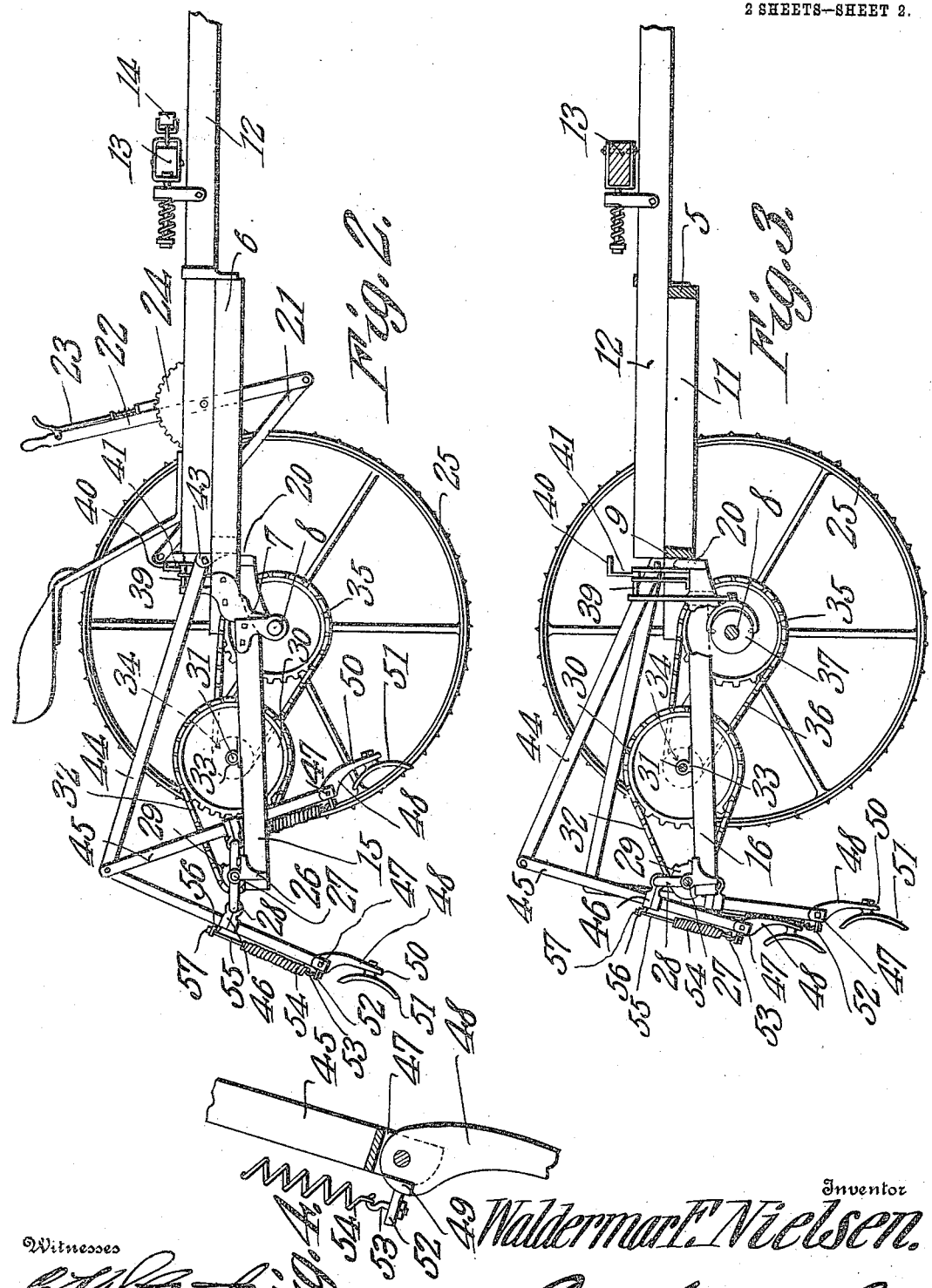

UNITED STATES PATENT OFFICE.

WALDERMAR F. NIELSEN, OF JUNCTION CITY, OREGON.

CULTIVATOR.

962,520.  Specification of Letters Patent.   Patented June 28, 1910.

Application filed August 24, 1909.  Serial No. 514,422.

*To all whom it may concern:*

Be it known that I, WALDERMAR F. NIELSEN, a citizen of the United States, residing at Junction City, in the county of Lane and State of Oregon, have invented a new and useful Cultivator, of which the following is a specification.

It is the object of the present invention to provide an improved construction of cultivator and this invention relates more specifically to that class of cultivators in which a plurality of blades are mounted upon arms actuated from a crank shaft in such manner as to impart quick downward and rearward movement of the blades into the soil.

One of the novel features of the invention resides in the manner of mounting the blades upon the arms so that they will not be injured should they come in contact with stones or hard clods of soil, the manner of mounting the blades being such as to permit of yield to the proper degree under such conditions, against the tension of springs.

A further feature of the invention resides in the general construction and arrangement of the parts of the cultivator and particularly in the manner of mounting the supplemental frame thereof and the means provided for tilting this frame to various angles so as to cause the cultivator blades to dig more or less deeply into the soil being treated.

With the above and other objects in view, the invention consists in the construction and arrangement of parts shown in the accompanying drawings, in which—

Figure 1 is a top plan view of the cultivator having the present invention, Fig. 2 is a side elevation thereof, Fig. 3 is a vertical longitudinal sectional view. Fig. 4 is a detail view partly in section, illustrating the manner of mounting the cultivator blades upon their supporting arms.

The cultivator embodying the present invention is comprised in part of a main and a supplemental frame, and of these frames, the main frame is indicated by the reference character A and the supplemental frame by the reference character B. The frame A consists of a forward portion indicated by the numeral 5 and side portions indicated by the numeral 6, and each of these side portions is provided at its rear end with a bearing box 7 in which is rotatably journaled an axle indicated by the numeral 8. The main frame further embodies a cross brace beam indicated by the numeral 9 and diagonal braces 10 which connect this beam and the side members 6 of the frame and also a front to rear extending brace 11 located midway between the side portions 6. A tongue 12 is supported by the main frame and projects forwardly therebeyond and in turn supports suitable draft appliances such as a double-tree 13 and swingle trees 14.

The supplemental frame B is comprised of side members which are indicated by the numeral 15, intermediate members indicated by the numeral 16, and cross brace beams 17; also braces 18 to connect the cross beams 17 and the side and intermediate numbers 15 and 16, each of these cross beams connecting one of the side members 15 and one of the intermediate members 16.

It will be understood that the main frame A has pivotal connection with the axle 8, and it is supported, when the machine is in use, by the draft animals and also by reason of such connections between this frame and the supplemental frame which supplemental frame, by reason of such connection, exerts counterbalancing weight upon the main frame. It will further be understood that the supplemental frame has pivotal connection with the axle 8 and may be adjusted angularly with respect thereto.

It will be observed from inspection of Fig. 1 of the drawings that one of the intermediate frame members 16 of the supplemental frame B has its forward portion bent to extend laterally at right angles as at 19 and secured at the other end of the two intermediate members 16 adjacent the forward end thereof, this last mentioned member 16 having its forward portion bent to extend upwardly and forwardly as at 20 and having pivoted to it the rear end of a connecting rod 21. This connecting rod 21 has pivotal connection at its forward end with the lower end of a lever 22 which is mounted to one side of the tongue of the machine upon the main frame A and has a hand operated pawl mechanism 23 which coöperates with a segmental rack 24 also upon the main frame.

It will be understood that lever 22 may be rocked so as to vary the angle of inclination of the supplemental frame and it is this supplemental frame which carries the supporting arms for the cultivator blades and the crank shaft for operating these arms to cause the blades to dig into the soil as will be presently explained.

The axle 8 is supported upon ground wheels 25 as illustrated in the several figures of the drawings, and these ground wheels 25 have pawl and ratchet clutch connection with the axle 8 as in the ordinary farming machine whereby the cultivating mechanism will be rendered inoperative when the machine is moving backward or under other conditions.

At their near ends each of the side and intermediate members 15 and 16 respectively is provided with a bearing box indicated by the numeral 26 and journaled for rotation in these bearing boxes is a shaft 27 having a plurality of cranks 28 which are alternately oppositely disposed. This shaft 27 carries a small sprocket gear 29 about which and a similar gear 30 upon a shaft 31 is trained a sprocket chain 32, the shaft 31 being journaled in bearings 33 upon the two intermediate frame members 16 and these bearings 33 being adjustable. Also upon the shaft 31 is fixed a sprocket gear 34 and a sprocket gear 35 is fixed upon the axle 8 and a sprocket chain 36 is trained about the two gears 34 and 35, the gear 35 being loose upon the axle but being adapted to be clutched for rotation therewith through the medium of a clutch member 37 which is splined upon the axle, and adapted to be thrown into and out of engagement with a clutch base 38 upon the gear 35 through the medium of a rock arm 39 actuated by a foot lever 40. This foot lever 40 has connections with the rocking arm 39 through the medium of a connecting rod 41 upon which is disposed a spring 42 tending normally to hold the clutch member 37 out of engagement with the clutch face 38 of the sprocket gear 39.

Upon the transverse frame bar 9 are a number of brackets 43 and pivoted at its rear end to each of these brackets is a bar 44, the bar being capable of vertical swinging movement. An arm 45 is pivoted at its upper end to the rear end of each of the bars 44 and upon each of the arms 45 there is secured a two part bearing indicated by the numeral 46, each bearing receiving one of the cranks 28 of the shaft 27. The lower end of each arm 45 is bifurcated or of yoke formation as indicated by the numeral 47 and pivoted in the bifurcation of each arm is the upper end of a short blade standard indicated by the numeral 48, this standard being formed with a lug 49 which abuts against the forward edge of the furcations of the arm 45 when the standard is swung forwardly to a certain point, the abutment of the lug against the arm 32 limiting such forward swinging movement. Each of the standards 48 at its lower end is flattened as at 50 and has secured to its flattened portion a substantially concavo-convex cultivator blade indicated by the numeral 51. The concave faces of these blades are presented rearwardly and their cutting edges downwardly so that they will properly enter the soil. Each standard 48 is formed at its upper or pivoted end and at its rear side or edge with an ear 52 with which is connected a hook 53 having engaged therewith the lower end of a spring 54. The upper end of this spring is connected to a threaded adjusting rod 55 which projects upwardly and through an opening in a lug 56 upon the respective bearings 46, there being a nut 57 threaded upon this rod whereby the tension of the spring 54 may be adjusted to the desired degree.

From the foregoing description of the invention it will be readily understood that as the crank shaft 27 rotates, the arm 45 will move upwardly and rearwardly and then downwardly and forwardly, and that upon their downward forward movement, the cultivator blades carried thereby will dig into the soil being cultivated, it being understood that this peculiar oscillatory movement of the arms is insured by reason of their connection with the respective bars 44.

It will be observed from inspection of Figs. 2 and 3 of the drawings that each of the bearings 26 is adjustable longitudinally upon the respective frame members 15 or 16 and that as a consequence the position of the crank shaft upon the supplemental frame may be varied so that the blades may be caused to enter the soil at the desired angle. For example, if the bearings 26 are slid forwardly upon their respective frame members and are held at such adjustment, the blades will enter the ground with a nearly vertical thrust whereas if these bearings were adjusted rearwardly upon their respective frame members, the blade will enter the ground at an angle with their cutting edges foremost considering the direction of their movement.

It will further be understood from an inspection of the drawings and from the foregoing description that whereas the rearward swinging movement of the standards 48 is limited by reason of the abutment of the lugs 49 against the respective arms 45, these standards may have forward swinging movement against the tension of the springs 54 and are in this manner protected against injury should the blades carried by the standards come in contact with large rocks or hard clods of soil, also, should the machine be working in hard dry soil.

It will further be understood that the lever 22 may be adjusted to vary the angle of inclination of the supplemental frame and in this manner the blades may be caused to enter more or less deeply into the soil being treated depending upon the angle of inclination.

Having thus described my invention, what I claim as new and desire to protect by Letters Patent is—

In a cultivator, an axle; a main frame having side members pivoted at their rear ends to the axle; a supplemental frame comprising side bars pivoted at their forward ends to the axle, intermediate bars, frame members connecting the side and intermediate bars, one of said intermediate bars being pivoted to the axle and extending forwardly therebeyond, the other said intermediate bar being pivoted to the axle and extended forwardly therebeyond and thence extended laterally and in advance of the axle and secured at its extremity to the forwardly extended portion of the first mentioned intermediate bar, the said first mentioned intermediate bar having its forwardly extended portion, at its end, projecting upwardly; a lever mounted upon the main frame, a rod connecting the lever and the upstanding end of the forwardly extended portion of the first mentioned intermediate bar; and cultivator mechanism mounted in the supplemental frame, and driven from said axle.

In testimony that I claim the foregoing as my own, I have hereto affixed my signature in the presence of two witnesses.

WALDERMAR F. NIELSEN.

Witnesses:
  W. C. WASHBURNE,
  A. C. NIELSEN, Sr.